March 7, 1967 E. E. HESS 3,308,427

PASSING SIGNAL SYSTEM FOR MOTOR VEHICLES

Filed Dec. 2, 1963 3 Sheets-Sheet 1

INVENTOR.
EMERSON E. HESS
BY
MAHONEY, MILLER & RAMBO
BY
ATTORNEYS

March 7, 1967  E. E. HESS  3,308,427
PASSING SIGNAL SYSTEM FOR MOTOR VEHICLES
Filed Dec. 2, 1963  3 Sheets-Sheet 2
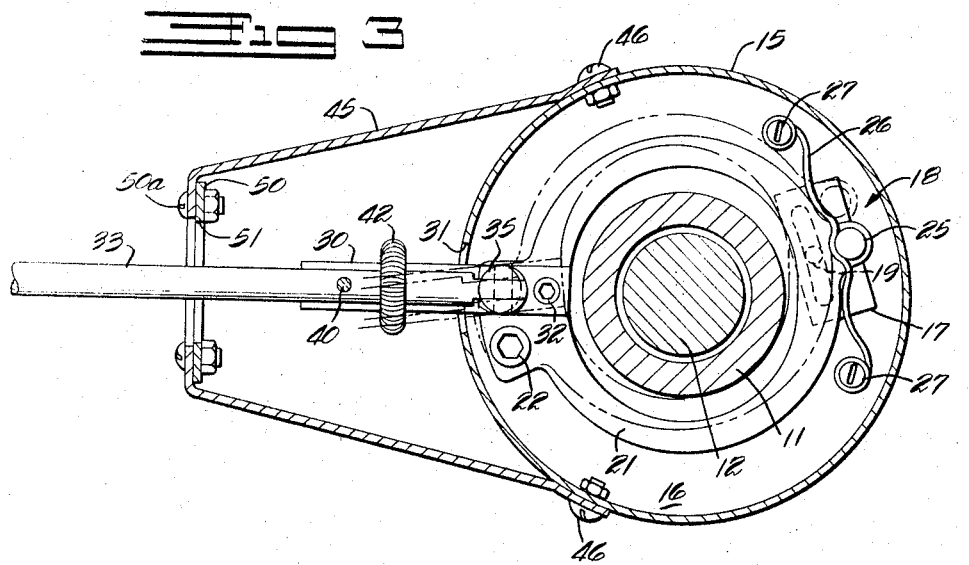
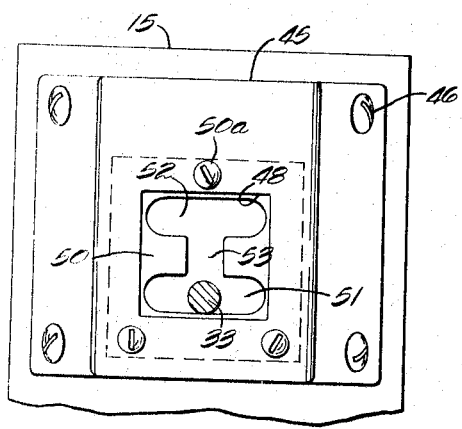
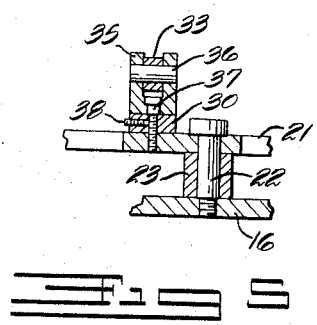
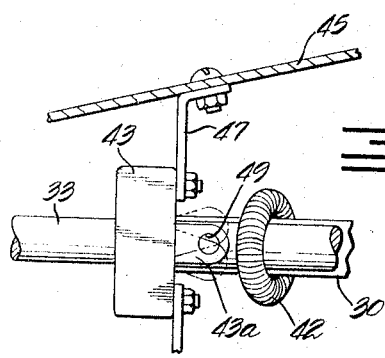
INVENTOR.
EMERSON E. HESS
BY
MAHONEY, MILLER & RAMBO
BY
ATTORNEYS

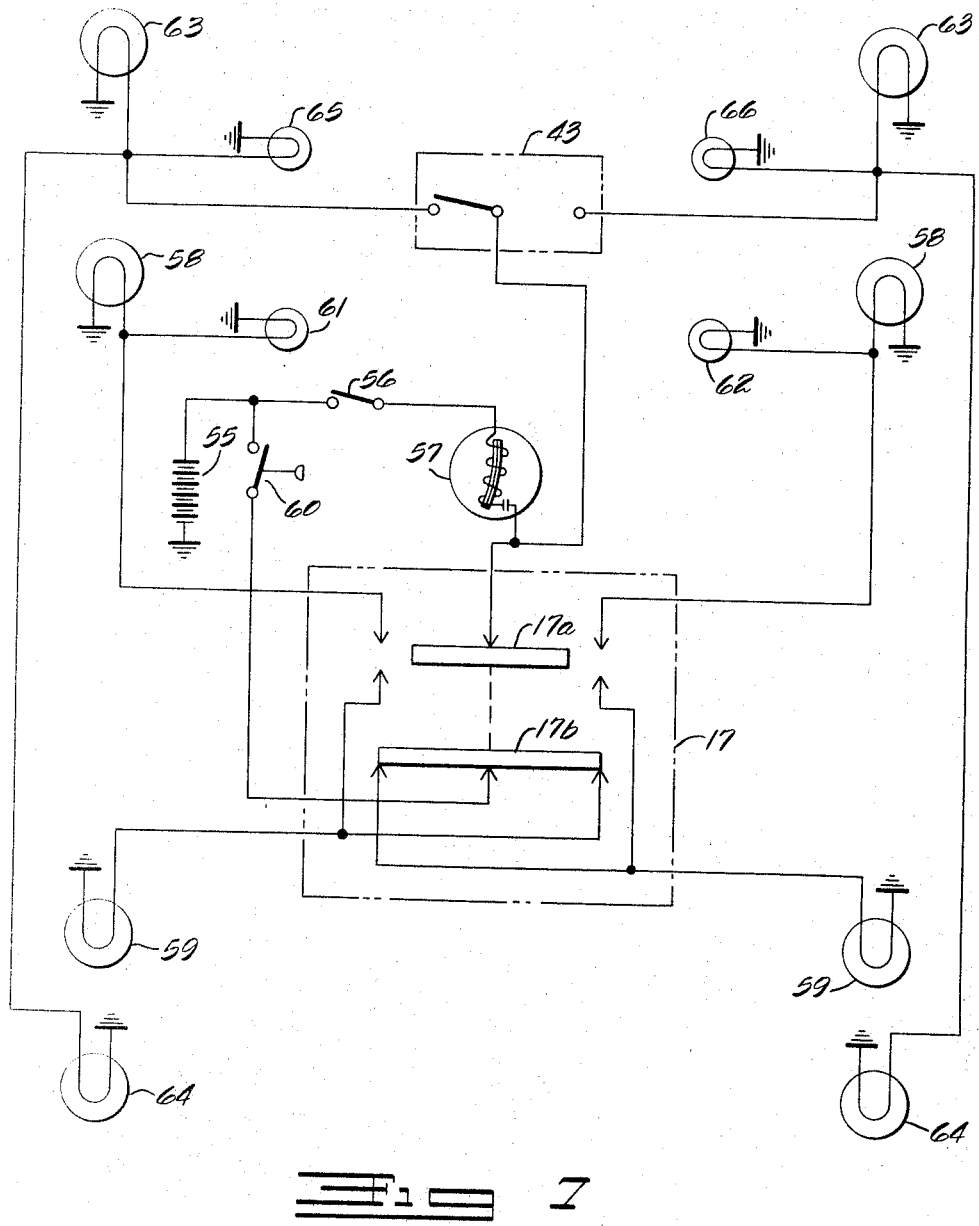

United States Patent Office 3,308,427
Patented Mar. 7, 1967

3,308,427
PASSING SIGNAL SYSTEM FOR
MOTOR VEHICLES
Emerson E. Hess, Powell, Ohio 43065
Filed Dec. 2, 1963, Ser. No. 327,468
3 Claims. (Cl. 340—78)

This invention relates, in general, to vehicle directional signaling systems. It relates, more specifically, to a passing signal and turn-stop signal system and the apparatus therefor for an automotive vehicle.

Driving safety on the high-speed, multi-lane highways of the present has become a problem of continually increasing importance. One safety factor which is characteristic to multi-lane highways is the effect of lane changing and turning of a vehicle relative to a following vehicle or an approaching vehicle in an adjacent lane. Without appropriate signaling by the operator of a vehicle prior to effecting a directional change, the operator of another vehicle, particularly a following vehicle, will be unaware of the contemplated change, or may be misinformed, and will, therefore, be unable to adapt his driving accordingly. Hand signals have been devised and standardized and their use authorized; however, their use was not as extensive as desired, particularly in inclement weather. For this reason, the well known electrical turn signals were developed as a replacement for the conventional hand signals to conveniently communicate a proposed alteration of direction. The turn signals have been found to be very effective in the past to indicate that the vehicle will turn off the highway to either the right or the left as the case may be. The turn signals are incorporated in the conventional brake light system to permit simultaneous signaling of a turn and the application of the vehicle's brakes for deceleration. In the case of multi-lane highways, a dangerous situation exists in the passing of a slower moving vehicle. Use of the conventional turn signals for a passing maneuver will mislead, or at least place in doubt, the operator of a following vehicle. Whatever the interpretation, the result is a potentially dangerous situation should the operator of the following vehicle interpret erroneously and act accordingly. This factor has reduced the effectiveness of the prior art turn signals with a consequent decrease in safety and efficient traffic flow.

It is, therefore, the primary object of this invention to provide an automotive vehicle directional signaling system and apparatus which is capable of selectively indicating a vehicle passing maneuver or a turn.

It is another important object of this invention to provide an automotive vehicle directional signaling system and apparatus which is capable of selectively indicating a vehicle passing maneuver or a turn and which prevents the simultaneous indication thereof.

It is a further object of this invention to provide an automotive vehicle directional signaling system and apparatus having separate indicating means for a passing maneuver and a turn and a single manually operable lever for selectively actuating either of the indicating means.

It is also an object of this invention to provide an automotive vehicle directional signaling system and apparatus having a passing maneuver indicator and a conventional turn-stop indicator, which are of the electrically operated type and include their respective switches, and a manually operable control which is selectively engageable with the switches.

These and other objects and advantages of this invention will be readily apparent from the following detailed description of an embodiment thereof and the accompanying drawings.

In the drawings:
FIGURE 1 is a fragmentary top plan view of an automotive vehicle steering wheel and the mechanical operating mechanism of the directional signaling system and apparatus of this invention.

FIGURE 3 is a transverse sectional view taken along line 3—3 of FIG. 2.

FIGURE 4 is a sectional view taken along line 4—4 of FIG. 2.

FIGURE 5 is a sectional view of the operating lever pivot structure taken along line 5—5 of FIG. 2.

FIGURE 6 is a sectional view taken along line 6—6 of FIG. 2.

FIGURE 7 is a schematic diagram of the electrical system.

Figure 1:
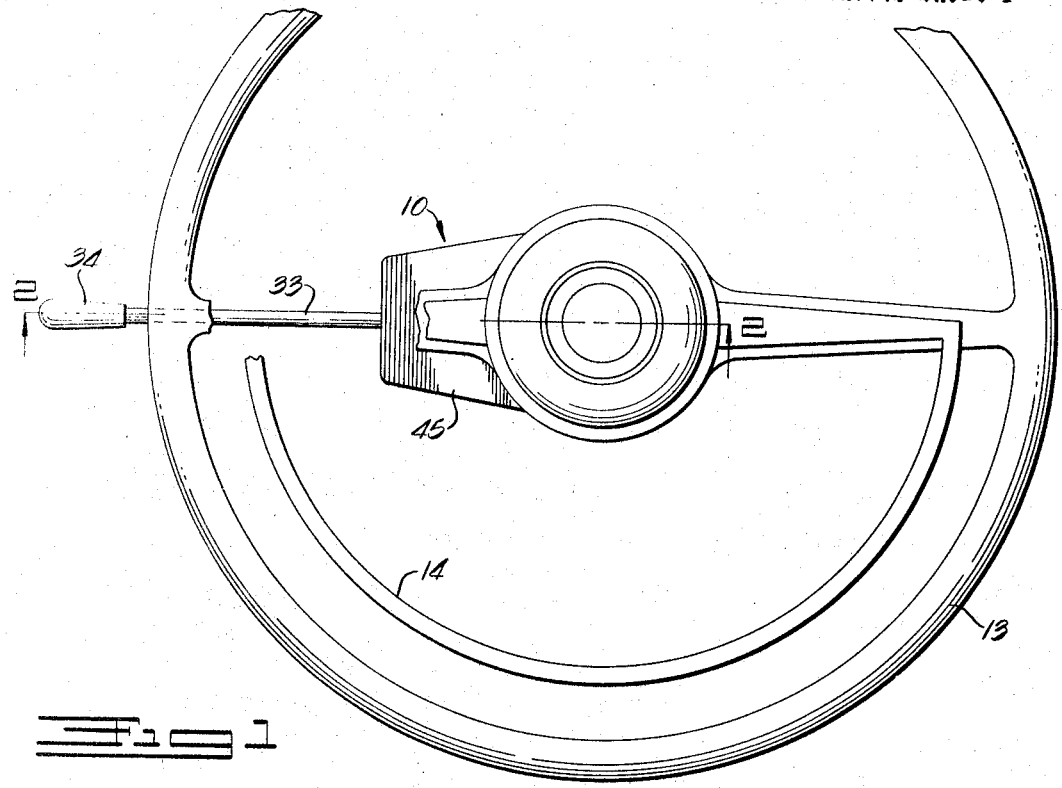

Referring to the drawings, particularly FIG. 1, an embodiment of the control structure 10 of the signaling system is shown mounted on a conventional automotive vehicle steering column. The steering column comprises an elongated, tubular supporting column 11, a coaxial shaft 12 and a wheel 13 which is fixed on the upper end of the shaft 12. A horn ring 14 and associated electrical contact structure (not shown) is carried by the wheel 13 as is well known.

Mounted on the column 11 in coaxial relationship at the upper end thereof is an elongated, cylindrical housing 15 which may be of the well known form for housing the prior art turn signal switching apparatus. Carried within the housing 15 is a structural mounting plate 16 of annular ring form and which is secured to the housing. The plate 16 provides a suitable structural base for mounting of the several turn signal switch components and the switch actuating mechanism. The turn signal switch components include the usual well known elements of an electrical switch 17 and a switch actuator 18. The switch 17 is of the multiple contact slide type (also see FIG. 7) and is secured to the upper surface of the mounting plate 16. A pin 19 for operating the movable switch elements projects upwardly from the case thereof. The necessary electrical conductors, indicated at 20, are connected to their respective contacts and extend downwardly through the housing 15 and are connected to the appropriate components of the vehicle's electrical system which will be described in further detail hereinafter.

Mechanically connected to the switch operating pin 19 is the actuator 18 which comprises a rigid annular ring 21 disposed above the switch 17 and encircling the column 11. The ring 21 is pivotally secured to the mounting plate 16 by a headed bolt 22 threaded into the plate diametrically oppposite to the switch 17. A spacer 23 is interposed between the ring 21 and the plate 16 to position the ring at an appropriate elevation relative to the switch 17. Preferably, the bolt 22 is formed with a shoulder adjacent the threaded end which is engageable with the surface of the plate 16 to permit swinging of the ring 21. An aperture 24 is formed in the ring 21 for receiving the operating pin 19 of the switch whereby swinging movement of the ring will actuate the switch.

Fixed to the ring 21 at the side thereof adjacent the aperture 24 is an upstanding stud 25 which provides a position detent for the switch 17. The stud 25 is of cylindrical form, preferably fabricated from a suitable thermoplastic material, such as nylon, and is engageable with an elongated leaf spring 26 supported at each end by the pins 27 for flexing movement in a plane parallel to the mounting plate 16. The pins 27 are secured to the plate 16 at a point out of the range of movement of the ring 21. Formed in the spring 26 are three arcuately curved sections for receiving the stud 25 and thereby releasably holding the ring 21 and switch 17 in the desired position.

This concludes a brief description of the turn signal switch mechanism of the well known commercially available design and operation as is incorporated in the present invention. The remaining element of such a turn signal mechanism is a ratchet device which cooperates with the steering wheel 13 to automatically return the ring 21 and switch 17 to a center or neutral position upon completion of the turn. The ratchet device is well known and since it is not essential to the operation of the present mechanism except as would be normally expected, it is deemed unnecessary to provide further description or illustrations thereof.

Rigidly attached to the ring 21 adjacent the pivot bolt 22 is an elongated operating lever 30. The lever 30 projects laterally from the ring and extends through an opening 31 formed for this purpose in the wall of the housing 15. The width of the opening 31 is of sufficient extent to permit the necessary arcuate swinging of the lever 30 during the arcuate movement of the ring 21. A pair of cap screws 32 extending through the lever 30 are threaded into the ring 21 to secure the lever to the ring. Preferably, the point of attachment is at substantially the same place as where an operating lever extension of the prior art type turn signal would be attached to limit the swinging movement thereof necessary for operation of the switch 17.

Carried by the lever 30 and operatively engageable therewith is an elongated lever arm 33 which is adapted to be manipulated by the vehicle operator and, for this purpose, is provided with a finger grip 34 at the free end thereof. The opposite end of the arm 33 is pivotally secured between the bifurcated arms of a clevis 35 by a pivot pin 36. The clevis 35 is attached to the upper surface of the operating lever 30 so as to permit swinging movement of the arm 33 in a plane normal to the lever 30. Attachment of the clevis 35 is by a shouldered cap screw 37 (see FIG. 5) extending through the web portion thereof and threaded into the operating lever 30 permitting pivotal movement thereof relative to the lever. A setscrew 38 may be threaded into the lever 30 to engage the cap screw 37 and thereby prevent the inadvertent loosening thereof. As will be noted by reference to FIG. 2, the lever arm 33 is appropriately bent in order that a portion thereof will engage the lever 30 and be disposed parallel thereto.

Operative engagement of the lever arm 33 with the operating lever 30 is made by a pin 40 fixed in the arm and extending transversely thereto. The pin 40 projects a distance from the arm 33 to extend through an aperture 41 formed in the lever 30 adjacent the free end thereof. With the pin 40 disposed in the aperture 41, the arm 33 will be mechanically coupled to the lever 30 whereby manipulation of the arm by swinging it through an arc to either side of a central or neutral position will operate the switch 17. It is desirable that the arm 33 be operatively engaged with the lever 30 at any time the signaling system is not being utilized to prevent the random movement thereof. For this purpose, a closed loop, spirally wound spring 42, is mounted on the arm 33 and lever 30 which provides the necessary biasing force to maintain the arm and lever in engagement.

Figure 2:
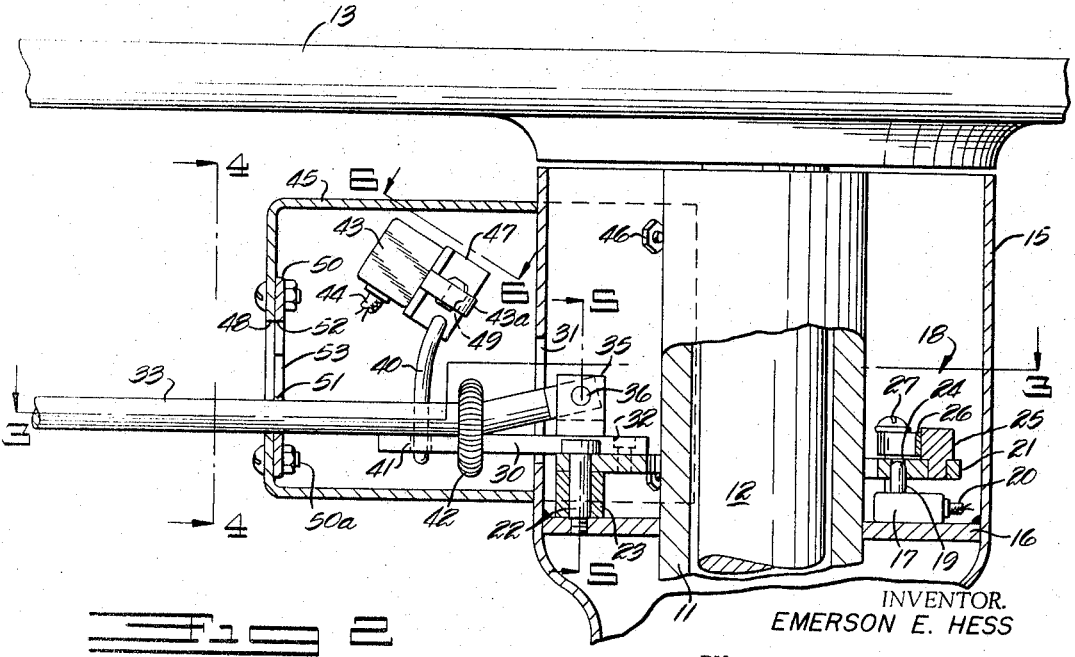
FIGURE 2 is a medial sectional view extending longitudinally of the steering wheel column taken along line 2—2 of FIG. 1.

The passing signal system includes a single pole, double throw electrical switch 43 which is selectively operable by the lever arm 33. This switch is preferably of the type having a mechanical detent for maintenance of the movable element in any of the three positions. Other elements of the passing signal system and their electrical connection to switch 43 will be subsequently described. Connection of the switch is made by the electrical conductors indicated at 44 which also extend down the housing 15. The switch 43 is supported in fixed relationship to the housing 15 and is disposed externally thereto. Support and protection for the switch is provided by a housing 45 of generally cubical shape which is attached to and carried by the cylindrical housing 15 by means of a plurality of bolts 46. The switch 43 is attached to the walls of the housing 45 by a pair of L-shaped brackets 47 which are bolted to the switch and housing (see FIG. 6). An opening 48 is formed in an end wall of the housing through which the lever arm 33 may project for manipulation. The switch 43 is positioned upwardly from the lever 30 and inclined relative thereto and oriented with the operating toggle lever 43a extending generally toward the pivotally mounted end of the lever arm 33. The pin 40 also extends upwardly from the lever arm 33 for insertion in an aperture 49 formed in the toggle lever 43a. As is best shown in FIG. 2, the upwardly extending portion of the pin 40 is arcuately bent to facilitate insertion in the toggle lever aperture 49. By appropriately positioning the switch 43 relative to the lever 30, the lever arm 33 will be capable of manipulation to selectively engage either the lever 30 or the toggle switch lever 43a. Operative engagement of arm 33 with the passing signal switch 43 is accomplished by swinging the arm upwardly about the pin 36 in the clevis 35 to withdraw the pin 40 from the aperture 41 in the lever 30 and to insert the opposite end of the pin in the aperture 49 in the toggle switch lever 43a. When engaged with the switch 43, the movement of the lever arm 33 will be in a plane extending through the pivot point of the clevis 35 and the arm may be swung in an arc to either side of a central or neutral position similar to the movement thereof for operating the turn signal switch 17.

A guide plate 50 is positioned in the opening 48 in the housing end wall and is secured thereto by bolts 50a to control the movement of the lever arm 33 and prevent the concurrent operation of both the turn signal and the passing signal systems through sequential manipulation of the arm. The guide plate 50 is thus formed with two elongated, spaced parrallel slots 51 and 52 and a centrally disposed slot 53 which interconnects the other two slots. The lower and upper slots, 51 and 52, are arranged to coincide with the movement of the lever arm 33 when operating the switches, 17 and 43, respectively, with the central slot 53 positioned to permit swinging movement of the arm about the clevis pin 36 only when the arm is in the neutral or central position. Thus, assuming that the switches 17 and 43 are in a center or neutral position, it will be seen that the lever arm 33 may be manipulated to engage either the lever 30 or the toggle switch lever 43a only when aligned with the central slot 53. This prevents concurrent operation of both switches as it is first necessary to return whichever switch had been operated to the center or neutral position before the arm 33 may be swung to cause engagement of the pin 40 with the opposite member.

The switches 17 and 43 of the control structure 10 are connected in an electrical system as diagrammatically illustrated in FIGURE 7 to provide a visual indication of the proposed or intended directional change. In the illustrated embodiment, the visible indication is provided by selectively operable electric lights located at both the front and rear of the vehicle with the passing signal lights being distinguishable from the turn signal lights by color or shape.

That portion of the electrical system of a vehicle associated with the turn-stop signals is of well known construction and is illustrated to indicate schematically the interconnection therewith of the passing signals. Included is an electrical power source 55, indicated as a battery but it is to be understood that a generator may also be included, and an electrical contact 56 which is a part of the well known ignition switch. The contacts 56 are interposed in a conductor which interconnects the battery 55 with a movable member 17a of the turn-stop switch. Also interposed in this conductor is a cyclic circuit interrupting device 57 that is commonly referred to as a "flasher." As is well known, the function of the flasher is to automatically open and close a set of contacts interposed in the conductor while the circuit is energized. Selectively connectable in the circuit are a pair of electric lights 58 located at opposite sides of the front of the vehicle and a pair of electric lights 59 located at opposite sides of the rear of the vehicle. Displacement of the switch member 17a from the illustrated center position will be seen to be effective to energize a front and a rear light, 58 and 59, associated with that particular side of the vehicle.

Also included in the vehicle's electrical system is a circuit energizing means responsive to the application of the brakes for energizing both rear lights 59 simultaneously. This circuit means comprises a pressure responsive switch 60 connected in circuit with the battery 55 and, also, a second movable member 17b of the turn signal switch. As will be seen from FIGURE 7, the second movable member 17b is designed to connect both of the rear lights 59 to the battery 55 simultaneously when the switch is in the center or neutral position and to connect only one of these lights when shifted to either side. The operation is such that with the switch 17 in a center position, the brake switch 60 is effective to simultaneously energize both rear lights 59. Shifting the switch to either of the other two positions is effective to energize both a rear and a front light, 58 and 59, associated with the same side of the vehicle through the flasher 57. At this time, that particular rear light 59 thus energized is removed from control by the brake switch 60 while the opposite rear light remains under the control thereof. A pair of pilot lights 61 and 62 are also connected in this turn signal circuit to provide an indication to the vehicle operator of the operation thereof. The pilot lights 61 and 62 are mounted on the vehicle's dashboard in view of the operator. As is the usual practice, each pilot light, 61 and 62, would be located adjacent its respective side of the vehicle whereby the vehicle operator will be apprised of not only the operation but which specific signal lights are operating.

The passing signal circuit, including the switch 43, comprises a pair of electric lights 63 positioned at opposite sides of the front of the vehicle and a similar pair of electric lights 64 positioned at opposite sides of the rear of the vehicle. The lights, 63 and 64, positioned at the same side of the vehicle are connected in parallel to the same terminal of switch 43 while the movable element thereof is tapped into the conductor leading from the flasher 57 to the element 17a of switch 17. As will be readily apparent from the schematic circuit diagram, the passing signal lights, 63 and 64, will also be cyclically energized to increase their effectiveness when the switch 43 is operated to complete a circuit to those lights positioned at the appropriate side of the vehicle. A pair of pilot lights 65 and 66 mounted on the dashboard in relatively spaced relationship are connected into the passing signal circuit to provide an indication of the operation of the passing signals.

When the turn and passing signals are not being utilized, the lever arm 33 will be maintained in operative engagement with the operating lever 30 by the spring 42. Assuming that the ratchet device for automatically returning the turn signal switch 17 to the center position has operated the lever arm 33 will also be centered in alignment with the center slot 53 of the guide plate. Also, the passing signal switch 43 will have been centered. Thus, none of the turn or passing signal lights 58, 59, 63, or 64 will be energized and the brake switch 60 will be effective to simultaneously energize the rear light 59 at any time the brake pedal is depressed. Should it be desired to indicate the intention to make either a right or left turn, the lever arm 33 may be swung in the appropriate direction along the slot 51 of the guide plate which results in swinging of the ring 21 about its pivot bolt 22. Swinging movement of the ring 21 effects movement of the turn switch movable elements 17a and 17b for energizing the lights 58 and 59 as is desired. Through the cooperation of the stud 25 with the spring 26, the switch 17 will remain in the desired position until returned through operation of the ratchet device or through manual operation.

If it is desired to indicate an intention to pass a vehicle, the lever arm 33, assuming it has been returned to the central position, will first be pivoted upwardly about the clevis pivot pin 36 into alignment with the upper guide slot 52. When properly aligned, the arm 33 may then be swung in an arc in either direction as may be desired to indicate the intended directional change. As the arm was swung upwardly, the pin 40 was withdrawn from the aperture 41 in the lever 30 and inserted in the aperture 49 in the toggle switch lever 43a. Subsequent swinging movement of the lever arm 33 will thus be seen to operate the switch 43 to energize the lights 63 and 64 at one side of the vehicle. After completion of the passing maneuver, it is necessary to manually return the arm 33 to the center position to terminate signaling of the passing maneuver. When returned, the arm 33 will be disengaged from the toggle switch lever 43a and engaged with the operating lever 30 by the spring 42.

It is readily apparent from the foregoing detailed description of this invention that a novel directional signaling system and apparatus has been provided to increase traffic safety. Positioning of electric lights at the front and rear of the vehicle in addition to the usual turn-stop signal lights conveniently permits advisement of other motor vehicle operators of intended passing maneuvers. Utilization of independent passing signal lights permits discrimination as to turning or passing. The control for the system permits selective operation of either the turn or passing signal lights and prevents their inadvertent simultaneous operation. Only one lever arm is needed for their operation and avoids complication of driving.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In combination with an automotive vehicle having an electrical power source and plural signal lights in a turn and stop signaling system including a turn signal switch having a selectively operable movable contact for connecting said turn and stop signaling system with said power source when displaced to either of selected positions at opposite sides of a center position and having an actuating member operatively coupled with said movable contact and pivotally supported for swinging movement to effect displacement of said movable contact, a cyclic circuit interrupting means connected in circuit with said turn signal switch and said power source, and a brake responsive switch connected in circuit with said turn signal switch and said power source for control of said stop signaling system when said turn signal switch is in a non-operable position, at least one stop signal being disabled when said turn signal is in a right or left signaling position; a passing signal system including front direction indicating means, rear direction indicating means, a passing signal switch connected in circuit with said front and rear direction indicating means and said power source through said cyclic circuit interrupting means, said passing signal switch having a selectively operable movable contact for completing a circuit to said front and rear indicating means for indicating the direction of passing when displaced to either of selected positions at opposite sides of a center position, and a lever arm pivotally supported by guide interlock means for swinging movement and having means for alternately mechanically coupling said lever arm with either said passing signal switch movable contact or said turn signal switch actuating member, said lever arm being movable from a center position of said guide interlock means for selective independent operation of either said turn signaling system or said passing signal system, said guide interlock means preventing simultaneous mechanical coupling to said turn signal switch actuating member and said passing signal switch movable contact, said brake responsive switch operable independently of said passing signal switch when said lever arm is coupled with said movable contact of said passing signal switch and when said lever arm is in said center position of said guide interlock means.

2. In the combination of claim 1, said actuating member of said turn signal switch being supported for swinging movement in a plane and said lever arm being supported for swinging movement in a plane parallel to the plane of movement of said actuating member and being pivotally supported for swinging movement in a plane perpendicular to the plane of movement of said actuating member for alternate coupling with said actuating member or the movable contact of said passing signal switch.

3. In the combination of claim 2, said lever arm being pivotally supported on said actuating member and normally mechanically coupled therewith.

References Cited by the Examiner

UNITED STATES PATENTS

| | | | |
|---|---|---|---|
| 2,851,674 | 9/1958 | Boone | 340—106 |
| 3,165,716 | 1/1965 | Epstein | 340—81 |
| 3,221,119 | 11/1965 | Weathers et al. | 200—61.27 |
| 3,229,250 | 1/1966 | Melkonian | 340—110 |

NEIL C. READ, *Primary Examiner.*

I. J. LEVIN, *Assistant Examiner.*